United States Patent [19]

Cramer

[11] 4,362,330
[45] Dec. 7, 1982

[54] SEE THROUGH AUTOMOBILE SUN VISOR

[76] Inventor: Francis W. Cramer, 4158 Caywood Cir., Orlando, Fla. 32810

[21] Appl. No.: 208,169

[22] Filed: Nov. 17, 1980

[51] Int. Cl.³ .............................................. B60J 3/00
[52] U.S. Cl. .............................. 296/97 F; 296/97 G; 350/276 R
[58] Field of Search ................. 296/97 R, 97 B, 97 F, 296/97 G, 97 H; 350/276 R; 222/480, 565; 239/58

[56] References Cited

U.S. PATENT DOCUMENTS

| | | | |
|---|---|---|---|
| 2,178,620 | 11/1939 | White | 222/480 |
| 2,721,759 | 10/1955 | Tashjian | 296/97 F |
| 2,744,783 | 5/1956 | Peavey | 296/97 H |
| 2,986,063 | 5/1961 | Etzenhouser | 296/97 F |
| 3,128,121 | 4/1964 | Greig | 296/97 H |
| 3,199,114 | 8/1965 | Malifaud | 350/276 R |
| 3,445,135 | 5/1969 | Masi | 296/97 C |

*Primary Examiner*—Joseph F. Peters, Jr.
*Assistant Examiner*—John A. Carroll
*Attorney, Agent, or Firm*—Duckworth, Allen, Dyer & Pettis

[57] ABSTRACT

An automobile sun visor comprising a flat visor member having opposing flat, parallel surfaces is adapted to be pivotably joined adjacent the windshield of an automobile. The member has plural slots therein, and a moveable member having slots therein is mounted against the visor member and over the slots therein, whereby a slot in the moveable member may be aligned with a slot in the visor member so that a restricted amount of light will pass through the slots.

9 Claims, 3 Drawing Figures

U.S. Patent  Dec. 7, 1982  4,362,330
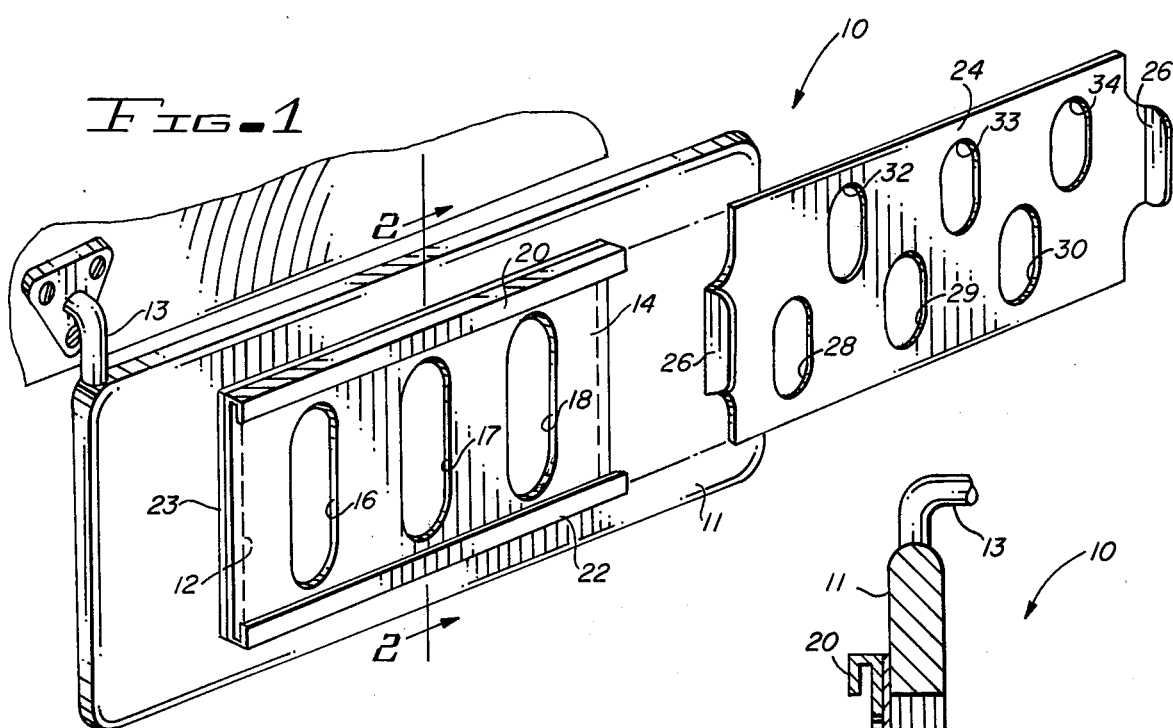
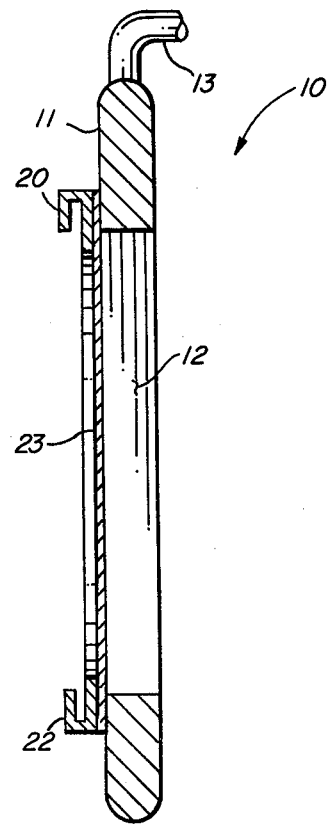
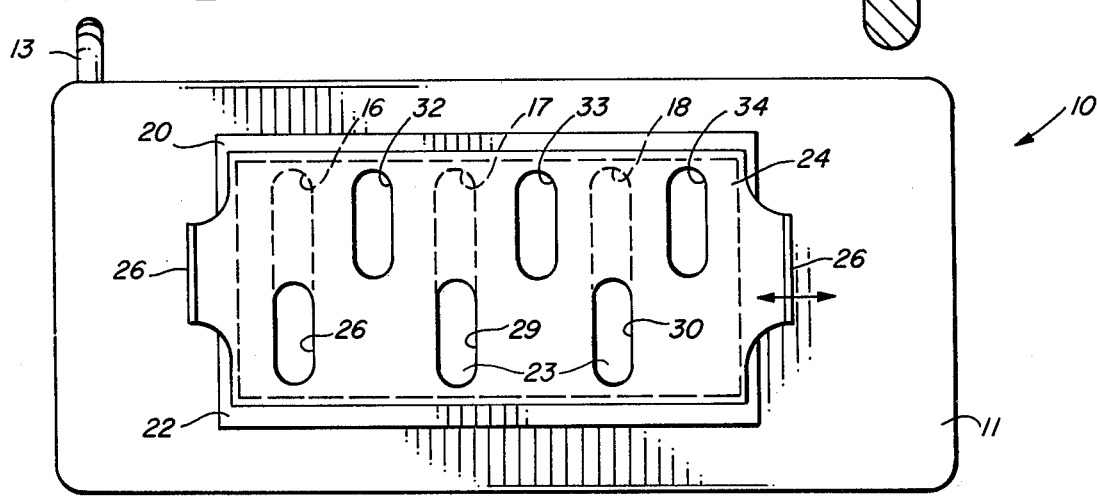

SEE THROUGH AUTOMOBILE SUN VISOR

BACKGROUND OF THE INVENTION

1. Field of the Invention

The present invention relates generally to automobile accessories, and more particularly relates to automobile sun visors which are adapted to permit a restricted amount of sunlight to pass through the visor, in order to permit the operator of the automobile to view certain objects, such as traffic signals, while reducing or avoiding any glare from the sun or other light sources.

2. Description of the Prior Art

Automobile sun visors are customarily pivotably joined at the edge of the headliner of the interior of the car, adjacent the windshield. Typically, the sun visor is pivotable downward across the upper portion of the windshield, in order to reduce glare entering the windshield.

If an automobile approaches a traffic signal in such a manner that the operator must look at the traffic signal and in the general direction of the sun at the same time, the glare of sunlight frequently renders the operator unable to distinguish the colors of the traffic signal. A similar problem occurs when an automobile is stopped at a traffic light, when the operator is unable to detect a change in the signal colors. In either event, failure of the operator of the automobile to correctly discern the actual colors of the traffic signals often creates a dangerous condition, and occasionally leads to serious traffic accidents.

There have been suggestions in the prior art for providing special purpose sun visors having means for permitting a restricted amount of light to pass through the sun visor, in order to let the operator observe a traffic signal, or to see the road ahead in high glare conditons.

In U.S. Pat. No. 2,744,783, Peavey et al. discloses "twin control glare shields" which essentially comprise light filters permanently fixed in the sun visor. More specifically, the sun visor arrangement disclosed by Peavey has two sighting openings in the visor, one opening providing a shielded sight path through which the operator can look straight ahead, for example while another vehicle is approaching. The second opening provides an unobstructed view through which the operator may look downwardly and towards the right of the vehicle, in order to better see the right side of the road. The remainder of the glare shield is formed of the filtering material.

In U.S. Pat. No. 3,445,135, Masi discloses "a perforated sun visor particularly for motor vehicles". As disclosed by the patentee, a conventional sun visor is provided with an accessory which is adapted to be fitted along the bottom thereof. The accessory has a plurality of small perforations having a diameter on the order of 0.5 to 1.5 millimeters, and spaced a distance of between 1.5 to 4 millimeters along the accessory. The object of the perforations is to permit outward visibility, while reducing the amount of "dazzle" or sunlight glare received by the operator through the windshield.

In U.S. Pat. No. 2,721,759, Tashjian discloses a "rotary anti-glare shield for motor vehicles". The arrangement disclosed by the patentee is a perforated disk which is rotatable at a sufficient speed to give the operator the effect of being able to see through the disk, while reducing the amount of glare entering the windshield toward the operator. The arrangement disclosed by Tashjian requires a motor mechanism of some type to rotate the disk to achieve the objects of that invention.

In U.S. Pat. No. 2,986,063, Etzenhouser discloses another rotary "glare shield" similar to that disclosed by Tashjian, in which peripheral slots are defined by two disks having offset slots, with one of the disks being formed of transparent material.

SUMMARY OF THE INVENTION

It is an object of the present invention to provide a glare-shielding sun visor of relatively simple construction which permits the operator (or any occupant) of an automotible to selectively choose the line-of-sight of incoming light passing through the sun visor.

The present invention contemplates an automobile sun visor comprising a flat visor member having opposing flat, parallel surfaces and adapted to be pivotably joined adjacent the windshield of the automobile, the member having plural vertical slots therein. A moveable member having slots therein is mounted against the member and over the slots, whereby the moveable member may be moved to align a slot therein with a slot in the visor member, such that a restricted amount of light is visible through both members. Motion of the moveable member, as by sliding or rotation (dependent upon the manner in which the template is moveably mounted against the member) permits another slot in the moveable member to be aligned with a second slot in the visor member, whereby a different direction for incoming light passing through the visor may be selected by the operator or occupant of the automobile.

In accordance with a preferred embodiment of the present invention, the slots with the visor member for example, those in a template, are relatively oblong, vertical slots, while the slots in the movable member are vertical, but are not as long as the slots in the visor. Further, certain of the slots in the moveable member are offset with respect to the next adjacent slots, in order that the operator or occupant can select either a high or low slot in the moveable member, with a particular slot in the visor member, to create a greater variety of line-of-sight choices for the operator by the simple expedient of sliding the moveable member.

In the specific embodiment of the present invention which is shown in the drawings, the moveable member comprises a flat plate slideable back and forth along one of the flat surfaces of that member, and over the slots in the visor member, to obtain the selective alignment between slots in the moveable member and slots in the visor member, as described above. The mounting means for the slideable plate in this embodiment preferably comprises parallel flanges extending horizontally along the selected flat surface of the visor member.

The present invention may be adapted for retrofitting onto existing sun visors by a use of a manufactured template having the flanges integrally formed thereon, which sheet is adapted to be fitted over a hole in the existing sun visor.

DESCRIPTION OF THE DRAWINGS

FIG. 1 is a front, perspective view of an automobile sun visor in accordance with the present invention, in which the template is extended off to the right side for purposes of illustration.

FIG. 2 is a cross-sectional view of a portion of FIG. 1 taken along the lines 2—2.

FIG. 3 is another front view of a sun visor in accordance with the present invention, illustrating the template positioned in a manner to permit a restricted amount of sunlight to pass through the sun visor.

DETAILED DESCRIPTION

A detailed description of the glare-shielding sun visor of the present invention will now be described in reference to the drawing.

Noting FIG. 1, the sun visor of the present invention is referred to generally with the reference numeral 10.

The sun visor 10 includes a conventional visor member 11 adapted to be mounted to an automobile headliner via a post 13 in a well-known manner.

For purposes of this description, it is assumed that the visor member 11 is a previously manufactured visor to which the present invention is to be adapted. To that end, the visor member 11 is provided with a rectangular hole 12, as by cutting. A rectangular template 14 is fitted over the hole 12. Preferably, the template 14 is made of a high impact plastic, aluminum or similar low cost material.

In accordance with the present invention, the template is provided with plural vertical slots 16, 17 and 18, and a pair of horizontally extending parallel flanges 20 and 22. Noting FIG. 2, a layer 23 of a smoked (bronzed) plexiglass extends across the sheet 14 and over the slots 16, 18 to reduce the glare from light entering those slots. Preferably, the layer 23 is between the template 14 and the member 11.

Noting the right side of FIG. 1, the sun visor 10 is fully provided with a moveable member formed of a flat plate 24 having curled finger grips 26 on either end. The moveable member 24 is opaque, and is dimensioned so that it may slide back and forth between the flanges 20, 22 and the flat surface of the visor member 11, and over the slots 16, 18. The moveable member 24 is further provided with a series of slots 28, 30 and 32, 34. As shown, the slots 28, 30 are smaller in vertical dimension than the slots 16, 18 of the template 14, as the upper slots 32, 34, and is offset with respect to the next adjacent slot in the moveable member. While the arrangement of slots 28, 30 and 32, 34 of the member 24 is described by way of example, it will be understood that various other combinations of slots in the sun visor member 11 and the moveable member 24 may be used without departing from the spirit and scope of the present invention.

Reference is now made to FIG. 3, where it will be seen that movement of the member 24 back and forth permits either the lower slots 28, 30 to be aligned with the slots 16, 18 in the visor member 11, or alternatively to permit the upper slots 32, 34 to be aligned with slots 16, 18 in the visor member 11. In this way, the operator of the automobile may selectively choose whether a higher or lower line-of-sight of light passing through the slots is obtained, and thereby limit any incoming glare with the exception of specific light directed along that line-of-sight.

It will be understood that this arrangement is particularly useful for an automobile operator approaching a traffic light, or waiting at a traffic light to determine when the signals have changed.

It will be further understood that all light may be prevented from coming through the visor, by positioning the moveable member such that none of its slots are aligned with the slots in the template.

I claim:

1. An automobile sun visor comprising:
   (a) a flat visor member having opposing flat parallel surfaces and adapted to be pivotably joined adjacent the windshield of an automobile, said member having plural slots therein;
   (b) a moveable member having slots therein;
   (c) means for mounting said moveable member against said visor member and over said slots in said flat visor member, whereby said moveable member may be moved to align a slot in said moveable member with a slot in said visor member; and wherein
   (d) movement of said moveable member permits the automobile operator to align at least one of said slots in said moveable member with one of said slots of said visor member, so that a retricted amount of light is visible along a selected line-of-sight through both said members.

2. The automobile sun visor recited in claim 1 wherein some of said slots in one of said flat visor and moveable members are offset with respect to other slots in the other of said members, whereby at least one slot in one of said flat visor and moveable members is not aligned with a slot in the other of said members.

3. The automobile sun visor recited in claim 2 wherein said moveable member comprises a flat plate slideable back and forth along one of said flat surfaces of said visor member.

4. The automobile sun visor recited in claim 3 wherein said mounting means comprises a pair of parallel flanges adapted to slideably hold said moveable member against said one flat surface.

5. The automobile sun visor recited in claim 4 wherein said slots in said visor member are elongated with respect to said slots in said moveable member, each said slot in said moveable member being offset with respect to the next adjacent slot, whereby alignment of one slot in said moveable member with a slot in said member causes misalignment of said next adjacent slot, so that light is restricted from passing through said next adjacent slot.

6. The automobile sun visor recited in claim 5 further comprising a layer of smoked material in said slots of said visor member to reduce the glare of sunlight passing therethrough.

7. An automobile sun visor, comprising;
   (a) flat visor member having opposed flat surfaces and adapted to be pivotably joined adjacent the windshield of an automobile, said visor member having a hole therethrough;
   (b) a template positioned over said hole in said visor, said template having plural slots therein;
   (c) a moveable member having slots therein;
   (d) means for mounting said moveable member against said template, whereby said moveable member may be moved to align at least one of said slots therein with a slot of said template; and wherein
   (e) movement of said moveable member permits a restricted amount of light through both said members.

8. The sun visor recited in claim 7, further comprising a layer of partially opaque material adjacent said slots of said template, to reduce the amount of light passing therethrough.

9. The sun visor recited in claim 7, wherein said mounting means comprises at least one flange joined with said template.

* * * * *